United States Patent Office 3,190,998
Patented June 22, 1965

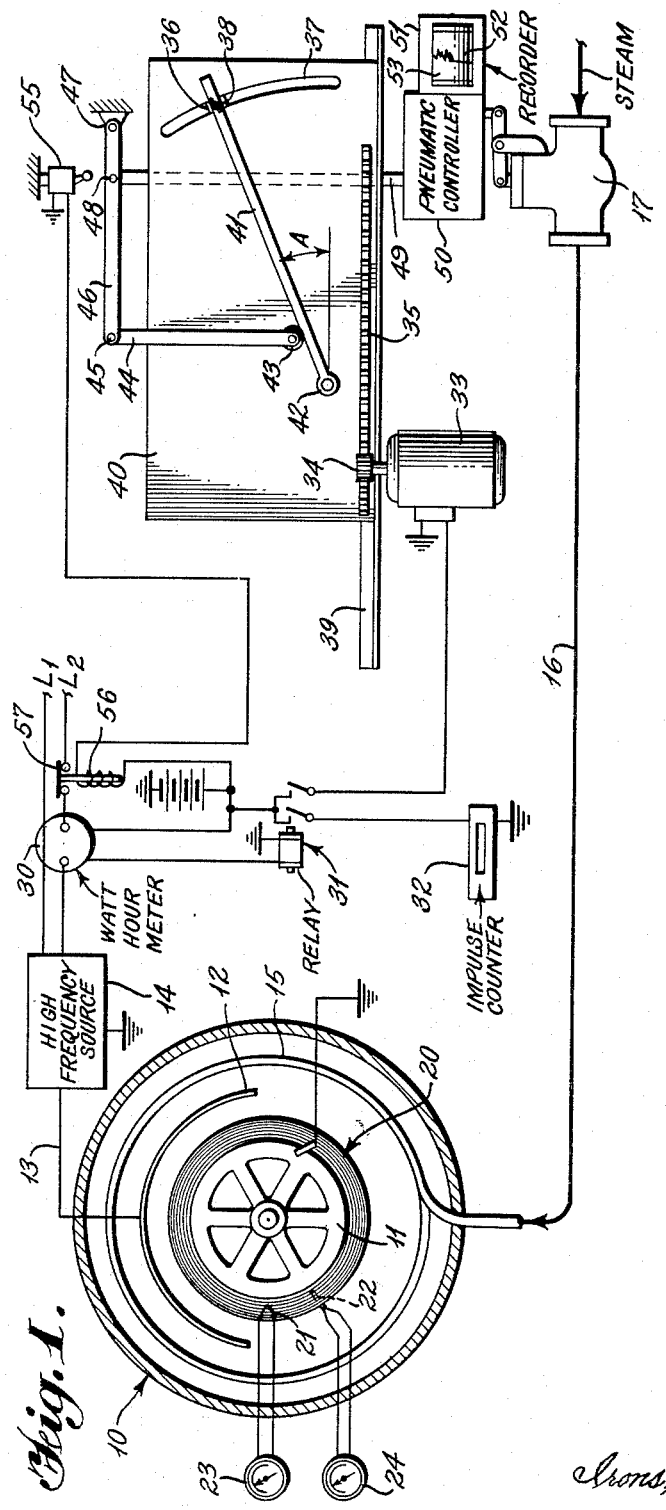
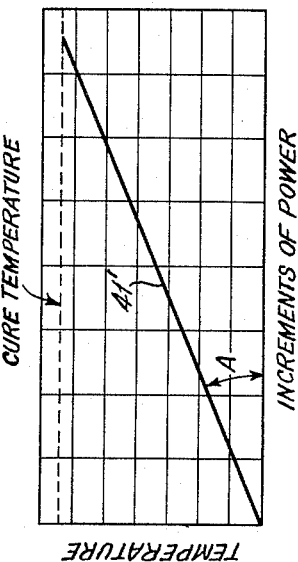

3,190,998
HEAT TREATING OF MATERIALS
Robert G. Dyke, Taunton, Mass., assignor to Rohm & Haas Company, Philadelphia, Pa., a corporation of Delaware
Filed Oct. 29, 1962, Ser. No. 233,689
13 Claims. (Cl. 219—10.47)

This invention relates to an apparatus and method for the highly uniform heating of a body of dielectric material, and more particularly, to such apparatus and method in which the heating is accomplished by both a source of high frequency electrical energy and a secondary source of heat for raising the temperature of the atmosphere surrounding the material.

Conventional heating processes which apply heat to the exterior of a body produce a strong heat gradient throughout the body being heated. Such processes are unsatisfactory for many applications which require highly uniform heating throughout the body being treated. Such is the case with the curing of vulcanizable materials such as the vulcanization of sheet rubber. In this area the art has turned to dielectric heating to interiorly heat the material while the atmosphere surrounding the material is heated also. A preferred device for dielectric heating of the material while also raising the temperature of the surrounding atmosphere as well as a comprehensive discussion of the problems attendant on non-uniform heating and the advantages obtained by use of the novel process and apparatus there described are set forth in Patent 2,703,436 of Daniel Rhee and Donald Cockburn.

As there described uniform curing of sheet rubber is achieved by forming a roll of alternating layers of uncured sheet rubber to be vulcanized and a sheet dielectric material. The sheet rubber is heated in the roll to vulcanizing temperature by positioning the roll in a high frequency electric field, the atmosphere surrounding the roll in the field being simultaneously raised in temperature by heating means independent of the field. The application of the field is terminated when the temperature of the rubber has been raised approximately to vulcanizing temperature and thereafter only the independent heating means is employed to maintain the rubber in the roll at vulcanizing temperature for a time period requisite to achieve vulcanization.

As the dielectric heating by its own action imparts essentially no heat to the atmosphere, it is critical to insure uniform heating of the sheet rubber in this process that the atmosphere surrounding the rubber sheet dielectric roll be raised in temperature by independent heating means such as steam coils at as near as possible the same rate as the internal temperature of the sheet rubber is raised in temperature. For example, the temperature between the interior and the exterior of the roll of rubber sheet dielectric may differ by as much as 20° where the independent heating means heats the atmosphere much faster or slower than the dielectric heating means.

Unfortunately, the temperature rise due to dielectric heating may have a rate significantly different from that due to the source of atmosphere heat such as steam coils. Further, while the temperature due to steam, called the "steam rise," can be controlled easily on a time basis with the use of existing commercial control equipment, the temperature rise due to dielectric heating, termed the "R-F rise," presents a much more complicated control problem.

The amount of energy supplied to the electrodes of the dielectric heating means as represented by the alternating current power input to the high frequency generator can be easily measured by a meter but this does not provide a direct indication of the total energy absorbed by the load and converted into a temperature rise within the load. In other words, the efficiency of the operation is not known. The efficiency will vary from load to load depending upon the stock, the manner in which the rolls of vulcanizable sheet material and interleaving material are applied to the roll, the accuracy of the tuning of the dielectric heating means, etc. Not only does the efficiency of conversion of the energy into heat vary from load to load, but also the rate at which the energy is taken by the load and converted into heat may vary for any given load during the course of the vulcanizing operation.

However, for each load it has been determined that a definite temperature rise in the load will occur for each predetermined increment or unit of power energy measured for example in watt hours, passing to the dielectric heating electrodes. On the other hand, this same energy increment may create a different temperature rise in a different load being vulcanized.

In U.S. Patent 3,031,888 to Kurt E. Wilhelm, apparatus is described for measuring the temperature rise of the interior of a rubber sheet dielectric roll. Utilizing the devices disclosed therein, it has been found that the time required to supply a certain increment of energy which will produce a given temperature rise during the course of curing a particular material load may vary between the start and finish of curing a load. In general, the temperature rise caused by heating the atmosphere surrounding the load as by means of steam coils is much faster than the rise due to the dielectric heating means. Consequently, the lack of accurate means to raise the temperature of the load uniformly to the curing temperature both internally and by the temperature of the atmosphere surrounding the load has resulted in hit and miss operation with numerous sheets of rubber having uncured sections or, alternatively, having overcured and even scorched outer edges.

Thus, the problem has been to provide control over the temperature rise of the material due to the secondary source of heat for the atmosphere surrounding the material in conjunction with the internal temperature rise of the material due to the high frequency electrical energy, and to achieve optimum results by effecting a rise in material temperature caused by the secondary source of heat identically with the rise caused by the high frequency energy.

It is an object of this invention to provide an improved apparatus and method for controlling the heating of a body of dielectric material by means of a source of high frequency electrical energy and a secondary source of heat.

It is a further object of this invention to provide such an improved apparatus and method in which control is provided over the temperature rise of the material due to the secondary source of heat in conjunction with the temperature rise of the material due to the high frequency electrical energy.

Still another object of this invention is to provide such an apparatus and method in which the rise in temperature caused by the secondary source of heat and the rise in temperature of the material caused by the high frequency energy are substantially identical.

Briefly, the method aspect of the invention comprises positioning the body of dielectric material between opposed electrodes and subjecting the body while so positioned to high frequency electrical energy while determining the temperature within the body and applying heat to the exterior of the body from a secondary source of heat in accordance with the internal temperature rise and the amount of high frequency electrical energy supplied to cause such rise so that the surface temperature of the body increases equally with the interior temperature of the body. The application of the high frequency energy may be terminated when the body reaches a desired temperature and the secondary source of heat continued to maintain the desired temperature for the desired period of treatment.

Apparatus for accomplishing this process comprises a source of high frequency electrical energy, opposed electrodes connected to the source, means to position the dielectric material to be dielectrically heated between the electrodes, a secondary source of heat in heat exchange relation with at least one surface of the material, means to sense the power input supplied to the high frequency source and indicate the units of power input, means to sense the temperature within the material and indicate the temperature rise therein, means to compare the units of power input and the temperature rise accompanying such units of power input to thereby generate a control factor, means for controlling the intensity of the secondary source of heat, means for applying the control factor to the controlling means so that the amount of heat supplied by the secondary source of heat is controlled in accordance with the control factor, and a limit switch operatively connected to cease application of the high-frequency energy source of heat to the material when a predetermined temperature value is reached.

Further objects, features and attending advantages of the invention will become apparent by reference to the following detailed description and the accompanying drawings, in which:

FIGURE 1 is a schematic drawing of the apparatus of this invention, and

FIGURE 2 is a graph of increments of power input to the high frequency source plotted against temperature of the material resulting from such increments of power input.

With reference to FIGURE 1, there is generally indicated at 10 an enclosure or autoclave within which the heat treating of the work is performed. A more detailed description of the autoclave is given in Patent 2,703,436 referred to supra. The material, generally indicated at 20, is the dielectric material to be heated. Dielectric material 20 may be wound onto a cylinder 11. Such material may comprise, for example, a sheet of dielectric vulcanizable material interleaved with sheet dielectric material which is non-adherent to the vulcanizable material, as set forth in U.S. Patent 2,703,436.

As illustrated schematically, the cylinder 11 is grounded to the casing of autoclave 10. The heat treating apparatus for the autoclave 10 includes an electrode 12 which is arcuate in configuration so as to conform substantially to the cylindrical surface of the material 20. Electrode 12 is the "hot" electrode of the high frequency dielectric heating means and is accordingly connected by means of a conductor 13 to a source 14 of high frequency electrical energy. Energy generated by source 14 is applied across "hot" electrode 12 and the "cold" electrode formed by the cylinder 11. The source 14 is shown grounded, so that a return through ground is completed between "cold" electrode 11 and source 14.

The secondary source of heat may be of any suitable type. In the illustrated embodiment, the secondary source of heat within the autoclave 10 is furnished by a steam coil 15 which is supplied from a steam line 16 controlled by a suitable valve 17 so that the steam input to coil 15 may be controlled. Further details of a secondary source of heat according to this embodiment are described in U.S. Patent 2,703,436.

The temperature of the interior of the material 20 to be heated within autoclave 10 may be suitably determined by use of the forms of apparatus described in U.S. Patent 3,031,888 to Kurt E. Wilhelm or by other temperature sensing devices. As diagrammatically illustrated on FIGURE 1, a thermocouple 21 interleaved with the sheet material on cylinder 11 and connected to a suitable temperature indicating instrument 23 externally of autoclave 10 such as disclosed in the Wilhelm patent may be used to determine the internal temperature of the load of material 20. Alternatively, the internal temperature may be determined by use of a thermocouple 22 carried at the end of a needle probe inserted through several layers of the sheet material to sense the temperature within the material with the thermocouple 22 connected to an external temperature indicating instrument 24, also as disclosed in the Wilhelm patent.

In accordance with the invention, means are provided for sensing by increments the electrical power delivered to the high frequency source 14 and thereupon to the load of material 20 within the autoclave 10, and for producing an output impulse for each increment of power energy delivered. In the embodiment illustrated, the sensing means is in the form of a watt hour meter 30 connected to the input of the high frequency source 14 to measure the flow of energy thereto which is thereupon supplied as high frequency electrical power to electrodes 11 and 12 in autoclave 10. Electrical impulses may be produced by suitable switch means (not shown) appropriately associated with the gear train of the meter so that the switch means is closed momentarily for each increment of power measured by the meter 30 and thereby one impulse created for each increment of power supplied to the load in the autoclave. Thus, after a predetermined amount of energy has been sensed by the meter 30, the gear train actuates the switch means, causing it to instantaneously close and then re-open. One such closing and re-opening creates a single impulse. It will be understood that many devices may be used to produce the desired impulses instead of the meter and switch means.

The electrical impulses from meter 30 actuate a rely 31, the contacts of which, in turn, transmit impulses to a stepping motor 33. Relay 31 also has contacts which transmit the impulses to an automatic counter 32 which indicates and cumulatively records the impulses, thereby indicating the units of power energy supplied to the electrodes 11 and 12 for each heating of a load of material 20. It will thus be apparent that a stepping mechanical output responsive to the sensing of energy flow by meter 30 is produced by motor 33, which motor is intermittently energized by the successive electrical impulses created as the contacts in meter 30 close and open with energy flow to the electrodes. The relay 31 is provided between motor 33 and meter 30 to provide a secondary circuit so that the contacts of the switch means in meter 30 will not be overloaded by intermittent operation of motor 33.

A vertically disposed plate 40 is mounted to slide or reciprocate horizontally in a suitable track 39. A rack 35 is horizontally disposed on plate 40 and aligned with the direction of slidable movement. Meshing with rack 35 is a pinion 34 connected to the output shaft of stepping motor 33. Plate 40 has a bar 41 pivoted as at 42 on the face of plate 40. This bar is swingable in an arc to assume selected inclined positions relative to plate 40 and has a clamp 36 slidable in slot 37 which can be tightened by wing nut 38 to fix the bar in a predetermined inclined position.

Slidably engaging bar 41 is a roller 43, mounted on rod 44 with rod 44 being connected by pivot 45 to a lever 46 and with the opposite end of lever 46 connected to fixed pivot 47. Connected to lever 46 at a pivot point 48 is an actuating arm 49 which extends to a pneumatic controller 50 which in turn adjusts the degree of opening of steam valve 17 in accordance with the movements of arm 49. The controller 50 may take any suitable well known form capable of obtaining control of valve 17 in proportion to the movements of arm 49. The controller in effect amplifies the small movement of arm 49 which may be of relatively low force and supplies a magnified actuating force to actuate valve 17. Obviously other types of actuating control mechanisms may be employed to obtain adjustment of steam valve 17 in relation to movements of arm 49.

A recorder 51 is shown associated with controller 50 with the recording pen 52 connected to form on chart 53 a continuous record of the steam valve adjustments plotted against time.

A limit switch 55 is mounted above lever 46 to be actuated thereby when the lever is elevated to a desired predetermined position, such position reflecting the attainment of a predetermined temperature in the dielectric material being heated. Limit switch 55 is connected to a relay 56 having contacts 57 which open the input circuit to the high frequency source 14 through leads $L_1$ and $L_2$ when switch 55 is actuated. Upon operation of switch 55 the supply of high frequency energy to the dielectric material 20 is cut off while the pneumatic controller 50 holds the steam supply valve 17 in position to continue supply of steam to autoclave 10 to maintain the temperature at the desired level to complete the heating of the material, this temperature being the temperature at which switch 55 is operated by lever 46.

It will now be helpful to examine the theory and principle upon which this invention is based.

In the method previously employed, temperature readings were taken during the cure cycle carried out in heating the material within the autoclave. If an attempt were made to adjust the steam or other secondary source of heat by comparing the temperature rise of the work due to the high frequency energy against time, the comparison could reflect a non-linear relationship between these two parameters. This non-linearity of temperature rise against time can be due to multivariables present in the operation. For example, such variables include the efficiency of the apparatus, the quantity and consistency of the material, and the constantly changing power factor of the material due to temperature rise. Thus, a given amount of temperature rise may take place for one time interval, while a succeeding equal amount of temperature rise may take place over quite a different time interval. Furthermore, even if the relationship of time to temperature rise could be determined for a given work batch, it is manifest, in view of the multivariables present in the operation that the temperature rise against time function for one batch may well be entirely unlike that for another batch.

On the other hand it has been determined that for each individual batch of material a given increment of energy of the high frequency power input will result in a definite temperature rise in the dielectric load of material. This particular temperature rise will occur irrespective of the time required for the increment of energy input to be supplied to the electrodes and load therebetween within the autoclave.

With reference now to FIGURE 2, the graph therein shows temperature measured on the ordinate and increments of power measured on the abscissa. In the light of the above discussion, it will be apparent that, if a succession of readings are taken of the rising temperature of the load of material due to the high frequency electrical energy, and these readings are each plotted on the graphs against the increments of input of power to the dielectric heating means, the locus of the coordinates will assume a straight line.

Since the impulses which are registered on impulse counter 32 and which intermittently energize stepping motor 33 define successive increments of the high frequency power energy, the abscissa of the FIGURE 2 graph may be indicated in terms of impulses or increments of power. Thus, as each impulse or group of impulses is registered on counter 32, a temperature reading may be taken from instrument 23 or 24, which record the temperature at the interior of the material 20, and therefore the temperature of the material due to the dielectric heating by the high frequency energy. From these readings, the graph of FIGURE 2 may be constructed, with a line 41' having a slope defined by an angle A.

It is to be expected that the efficiency of the dielectric heating means within the autoclave will vary with each load of material. Therefore, the time to achieve successive predetermined amounts of temperature rise will vary during the treating of each given load of material. Also the amount of temperature rise for a given energy input will differ between different loads. However, although the slope of line 41' may differ for different batches of material, nevertheless, for each separate batch of material the plot of line 41 will always be a straight line function characterized by its own particular slope A.

The sequence of operation of the heating cycle will now be described. The load of material 20 is placed within the autoclave 10, the internal temperature of the material determined as by means of thermocouples 21 or 22 indicating on instrument 23 or 24 and thereafter the high frequency energy source 14 placed in operation. At substantially the same time, valve 17 is opened sufficiently to admit an initial quantity of steam to introduce steam into coil 15 and commence heating of the atmosphere surrounding the material 20.

During the initial phase of heating, successive impulses are registered on impulse counter 32. Simultaneously with the register of an impulse or after several impulses a temperature reading is taken on instrument 23 or 24, which measures the temperature at the interior of load of material 20. From an initial set of such readings, the readings or signals indicating the temperature rise within the material and the units of high frequency power input are compared and the slope A of line 41' is quickly determined. It can, in view of the above-mentioned characteristics, be reliably anticipated that line 41' will continue at the same slope as long as the high frequency source remains in operation heating this particular load. Thus, this slope constitutes a linear control signal indicative of the desired amount of secondary heat to be applied. As soon as the slope A of line 41' is determined, pivoted bar 41 is adjusted and clamped by clamp 36 to the same slope A from the horizontal. The bar, then, together with plate 40, forms an automatically operated graph applying the control signal to the secondary source of heat and assures accurate uniformity in heating between the interior and exterior of the rubber sheet dielectric roll.

Throughout the operation, successive impulses from relay 31 continue to intermittently energize motor 33, so that plate 40 is continuously indexed to the left, as viewed in FIGURE 1, by the intermittently actuated pinion 34 driving rack 35. Bar 41, therefore, is likewise continuously indexed to the left and follower 43 is cammed upwardly by the incline determined by the slope A at which bar 41 has been set. It will be apparent that, as follower 43 continues to rise, lever 46 will be pivoted about point 47, successively raising actuating arm 49 and through the operation of controller 50 adjust the opening of valve 17 in incremental amounts, thus supplying an increasing amount of steam to coil 15 within the autoclave 10.

When the desired maximum temperature for treating the dielectric material has been reached the bar 41 will trip switch 55 and the high frequency heating source will be cut off. Thereafter and for the prescribed heating period for treatment of the dielectric material, the controller 50 will hold the steam valve 17 in a position to maintain the maximum temperature in the autoclave. Following this heating period, the steam will be cut off and the apparatus readied for treatment of the next load of material.

While in the embodiment illustrated, the step of setting the slope of bar 41 is described as being accomplished manually, it will be apparent to those skilled in the art that the step may be accomplished automatically. Thus, for example, suitable analog control means may be readily adapted to the apparatus for automatically comparing the magnitude of work temperature rise as detected by thermocouple 21 or 22 with increments of supplied power energy as detected by meter 30 and represented on the counter 32, the ratio obtained by such comparison being utilized to actuate suitable servo means to set the slope of bar 41 in accordance therewith.

In accordance with the invention hereinbefore described, there is provided a means of controlling the rate of temperature rise of a dielectric body of material due to a secondary source of heat, in conjunction with the rate of temperature rise of the material due to a high frequency source of energy. The invention results in a saving of the substantial losses heretofore suffered due to damage to entire batches of material and attendant losses in production, facilities, and time. Moreover, the method and apparatus herein provide accurate, simple and reliable control of the operation. Furthermore, the accurate control over temperature made possible by the instant invention assures heat uniformity through the thickness of the material being cured, thus permitting positive heating of the material by both the high frequency energy and the secondary source of heat throughout the curing cycle.

While I have illustrated the invention in only one embodiment, it will be apparent to those skilled in the art that various modifications may be made without departing from the scope of the invention. Therefore, I do not wish to be limited to the specific embodiments illustrated, but only by the claims which follow.

I claim:

1. Apparatus for heat treating dielectric material comprising a source of high frequency electrical energy, opposed electrodes connected to said source, means to position a dielectric material to be internally dielectrically heated between the said electrodes, a secondary source of heat in heat exchange relation with the external surface of said material, means to sense the power input supplied by said source of high frequency electrical energy to said electrodes and indicate the units of energy input thereto, means to sense the temperature within said material and indicate the temperature therein, means to relate the units of energy input to the temperature rise created by said units of energy input and generate a control signal representative of the relationship of said rise to said units, means for controlling the intensity of said secondary source of heat, and means for applying said control signal to said controlling means so that the intensity of said secondary source of heat is varied in accordance therewith.

2. The apparatus of claim 1 in which said secondary heat source is steam.

3. Apparatus for heat treating dielectric material comprising a source of high frequency electrical energy, opposed electrodes connected to said source, means to position a dielectric material to be heated between said electrodes, a secondary source of heat in heat-exchange relation with the surface of said material, means to sense the power energy input supplied by said source of high frequency electrical energy to said electrodes, means to sense the temperature within said material, control means operatively connected to said power sensing means and said temperature sensing means to generate a control signal which is a linear function of the energy input and the temperature rise caused by said energy input, means for controlling the intensity of said secondary source of heat, means for applying said control signal to said controlling means so that the intensity of said secondary source of heat is controlled in accordance therewith, and a limit switch operatively connected to terminate supply of power to said electrodes when said temperature sensing means detects a predetermined value.

4. Apparatus for heat treating dielectric material comprising a source of high frequency electrical energy, opposed electrode means connected to said source, means to position a dielectric material to be heated between said electrodes, a secondary source of heat in heat-exchange relation with said material, means to sense increments of electrical power supplied by said high frequency source, a motor responsive to said sensing means for producing an output in response to each of said increments, a variable cam adjustable to a cam gradient representing the relationship between said supplied power and the temperature rise of said material due to said supplied power, means for translating said intermittent output of said motor to indexing movement of said cam, a cam follower indexed by the movements of said cam, means for controlling the intensity of said secondary source of heat, means connecting said cam follower and said controlling means for successively adjusting the intensity of said secondary source of heat in incremental amounts in response to the indexing movement of said cam follower, and means to shut off said high frequency energy source of heat after a desired amount of travel of said cam and follower.

5. The apparatus of claim 1 wherein said secondary source of heat is steam and its supply to heat said material is continued after shut off of said high frequency energy.

6. Apparatus for heat treating dielectric material comprising a source of high frequency electrical energy, opposed electrode means connected to said source, means to position a dielectric material to be heated between said electrodes, a secondary source of heat in heat-exchange relation with said material, means for creating a series of electrical impulses, each impulse corresponding to a unit of electrical power supplied by said high frequency source, a motor electrically connected to said impulse means for intermittent energization thereby to provide an intermittent output, a variable cam adjustable to a cam gradient representing the relationship between said supplied power and the temperature rise of said material due to said supplied power, means for translating said intermittent output of said motor to indexing movement of said cam, a cam follower indexed by the movements of said cam, means for controlling the intensity of said secondary source of heat, means connecting said cam follower and said controlling means for successively adjusting the intensity of said secondary source of heat in incremental amounts in response to the indexing movement of said cam follower, and means to shut off said high frequency energy source of heat after a desired amount of travel of said cam and follower.

7. Apparatus for heat treating dielectric material comprising a source of high frequency electrical energy, opposed electrode means connected to said source, means to position a dielectric material to be heated between said electrodes, a secondary source of heat in heat-exchange relation with said material, means to sense increments of electrical power supplied by said high frequency source, a motor responsive to said sensing means for producing an output intermittently with each of said increments, a bar adjustable to a slope defined by the relationship between said supplied power and the temperature rise of said material due to said supplied power, follower means engaging said bar for movement therealong, means for translating said intermittent output to indexing relative movement of said follower means in the direction of increasing elevation along said bar, means for controlling the intensity of said secondary source of heat, means connecting said follower means and said controlling means for successively adjusting the intensity of said secondary source of heat in incremental amounts in response to the indexing movement of said follower means, and means to shut off said high frequency energy source of heat when said follower means reaches a desired ordinate.

8. Apparatus for heat treating dielectric material comprising a source of high frequency electrical energy, opposed electrode means connected to said source, means to position a dielectric material to be heated between said electrodes, a secondary source of heat in heat-exchange relation with said material, means to sense increments of electrical power supplied by said high frequency source, a motor responsive to said sensing means for producing an output intermittently with each of said increments, a bar adjustable to a slope defined by the locus of coordinates representing ordinates and abscissas, said ordinates defined by the temperature rise of the material due to said supplied power and said abscissas defined by the quantity of said supplied power, follower means engaging said bar for movement therealong, means for translating said intermittent output to indexing relative movement of said follower means in the direction of increasing abscissa, means for controlling the intensity of said secondary source of heat, and means connecting said follower means and said controlling means for successively adjusting the intensity of said secondary source of heat in incremental amounts in response to the indexing movement of said follower means.

9. Apparatus for curing a body of vulcanizable dielectric material comprising a source of high frequency electrical energy, opposed electrode means connected to said source, means to position a vulcanizable material to be cured between said electrodes, a secondary heat source for delivering heat to the ambient atmosphere surrounding said vulcanizable material, means for creating a series of electrical impulses in response to electrical power supplied by said high frequency source, a motor electrically connected to said impulse means for intermittent energization thereby to provide an intermittent output, a bar adjustable to a slope defined by the locus of coordinates representing ordinates and abscissas, said ordinates defined by the temperature rise of the material due to said supplied power and said abscissas defined by the quantity of said supplied power, follower means engaging said bar for movement therealong, means for translating said intermittent output to indexing relative movement of said follower means in the direction of increasing abscissa, means for controlling the intensity of said secondary source of heat, means connecting said follower means and said controlling means for successively adjusting the intensity of said secondary source of heat in incremental amounts in response to the indexing movement of said follower means, and limit switch means arranged and connected to shut off said high frequency source of heat when said follower means reaches to a desired ordinate.

10. The apparatus of claim 9 in which said secondary heat source is steam, and means are provided to maintain application of said secondary heat source after shut off of said high frequency source of heat.

11. A method for heat treating a body of dielectric material comprising subjecting the body to a high frequency electric field to raise the internal temperature of the body, sensing the units of high frequency electric power supplied to raise the internal temperature of the body, measuring the temperature rise within the body resulting from the units of power supplied, applying heat to the exterior of the body to raise the surface temperature of the body, relating the units of power supplied to the temperature rise caused thereby to establish a control factor and controlling the application of external heat in accordance with said control factor during continued subjecting of the body to said high frequency electric field so that the surface temperature of the body increases equally with the interior temperature of the body.

12. A method for heat treating a body of dielectric material comprising heating said body by placing it between electrodes connected to a source of high frequency electrical energy and subjecting said body to a secondary source of heat, sensing increments of power supplied by said high frequency source, intermittently actuating a motor in response to said increments to index a variable cam adjusted to a cam gradient representing the relationship between said supplied power and the temperature rise of said body due to said supplied power, and transmitting the indexing movement of said cam to a follower connected to means for controlling the input to said secondary source of heat to successively adjust in incremental amounts the heat intensity of said secondary source, and shutting off said source of high frequency electrical energy source of heat after said material reaches a desired temperature.

13. A method for curing a vulcanizable dielectric material comprising heating said body by placing it between electrodes connected to a source of high frequency electrical energy and simultaneously subjecting said body to steam heat, creating a series of electrical impulses in response to power supplied by said high frequency source, intermittently actuating a motor in response to said electrical impulses to index a bar adjusted to a slope from the axis of indexing movement, said slope representing the relationship between said supplied power and the temperature rise of said body due to said supplied power, and transmitting the indexing movement of said cam to a follower connected to means for controlling said steam heat thereby successively adjusting in incremental amounts the intensity of said steam heat, and shutting off said source of high frequency electrical energy after said follower reaches a desired point while continuing application of said steam heat for a prescribed period to vulcanize the material.

References Cited by the Examiner

UNITED STATES PATENTS

| | | | |
|---|---|---|---|
| 2,508,382 | 5/50 | Gard | 219—10.47 X |
| 2,510,770 | 6/50 | Bohn | 219—10.77 |
| 2,703,436 | 3/55 | Rhee et al. | 18—53 |
| 2,971,754 | 2/61 | Seyfried | 219—10.77 |
| 3,031,888 | 5/62 | Wilhelm | 73—351 |

RICHARD M. WOOD, *Primary Examiner.*